(12) United States Patent
Van Den Bosch et al.

(10) Patent No.: US 8,125,894 B2
(45) Date of Patent: Feb. 28, 2012

(54) REMOTE MANAGEMENT METHOD, A RELATED AUTO CONFIGURATION SERVER, A RELATED FURTHER AUTO CONFIGURATION SERVER, A RELATED ROUTING GATEWAY AND A RELATED DEVICE

(75) Inventors: Sven Jozef Jeanne Van Den Bosch, Lochristi (BE); Jeremy Nicolas Jean Herman De Clercq, Sint-Denijs-Westrem (BE); Christele Bouchat, Antwerp (BE)

(73) Assignee: Alcatel Lucent, Paris (FR)

( * ) Notice: Subject to any disclaimer, the term of this patent is extended or adjusted under 35 U.S.C. 154(b) by 798 days.

(21) Appl. No.: 11/293,310

(22) Filed: Dec. 5, 2005

(65) Prior Publication Data

US 2006/0120305 A1 Jun. 8, 2006

(30) Foreign Application Priority Data

Dec. 6, 2004 (EP) .................................. 04292881

(51) Int. Cl.
*G01R 31/08* (2006.01)
*H04L 12/28* (2006.01)
(52) U.S. Cl. ......... 370/219; 370/254; 370/389; 370/400
(58) Field of Classification Search .................. 370/401; 709/203
See application file for complete search history.

(56) References Cited

U.S. PATENT DOCUMENTS

| 5,852,722 | A | 12/1998 | Hamilton |
| 6,243,815 | B1 | 6/2001 | Antur |
| 6,345,294 | B1 | 2/2002 | O'Toole |
| 6,353,886 | B1 | 3/2002 | Howard |
| 7,239,629 | B1 * | 7/2007 | Olshansky et al. ............ 370/353 |
| 7,324,499 | B1 * | 1/2008 | Borella et al. ................ 370/349 |
| 2001/0024443 | A1 * | 9/2001 | Alriksson et al. ............. 370/401 |
| 2002/0065785 | A1 * | 5/2002 | Tsuda .............................. 705/67 |
| 2003/0039234 | A1 * | 2/2003 | Sharma et al. ................ 370/338 |
| 2003/0208609 | A1 * | 11/2003 | Brusca ........................... 709/230 |
| 2004/0087304 | A1 * | 5/2004 | Buddhikot et al. ......... 455/426.2 |
| 2004/0095881 | A1 * | 5/2004 | Borella et al. ................ 370/219 |
| 2004/0120328 | A1 * | 6/2004 | Adrangi et al. .............. 370/401 |
| 2005/0228874 | A1 * | 10/2005 | Edgett et al. .................. 709/220 |

FOREIGN PATENT DOCUMENTS

WO WO 01/97019 A 12/2001

OTHER PUBLICATIONS

DSL Home-Technical Working Group: "Technical Report TR-069: CPE WAN management Protocol" 'Online! May 2004 DSL-Forum, DSL Forum-Online, pp. 1-109, XP002326509. DSL Forum—WT-111—Revision 1—Applying TR-069 to Remote Management of Home Networking Devices—Aug. 2004—for CPE DSLHome Technical Workinig Group.

* cited by examiner

*Primary Examiner* — Huy Vu
*Assistant Examiner* — Brandon Renner
(74) *Attorney, Agent, or Firm* — Harness, Dickey & Pierce, P.L.C.

(57) ABSTRACT

The present invention relates to a Remote management method and related devices for use in a home network (HN) comprising a plurality of devices and a routing gateway. The Routing Gateway is coupled to each device of said plurality of devices. The Remote management method comprises the step of an Auto-Configuration Server managing either one of a dedicated device of said plurality of devices and the Routing Gateway or both at request. A further Auto-Configuration Server requesting the Auto-Configuration Server to access and configure the Routing Gateway for providing the further Auto-Configuration Server access to the Routing Gateway and subsequently the Auto-Configuration Server configuring the Routing Gateway to provide the further Auto-Configuration Server access to the Routing Gateway.

9 Claims, 3 Drawing Sheets

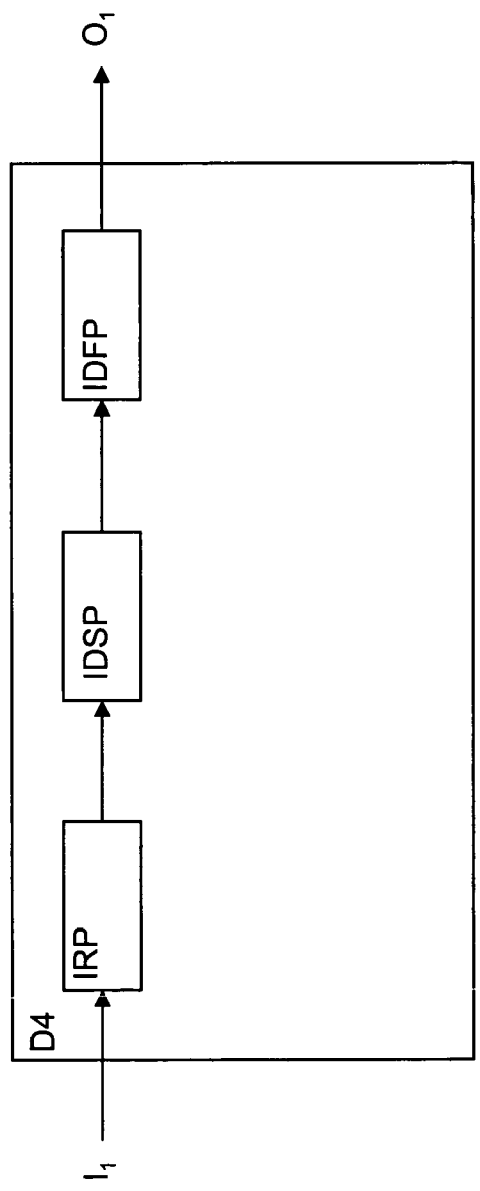
FIG.2: D4
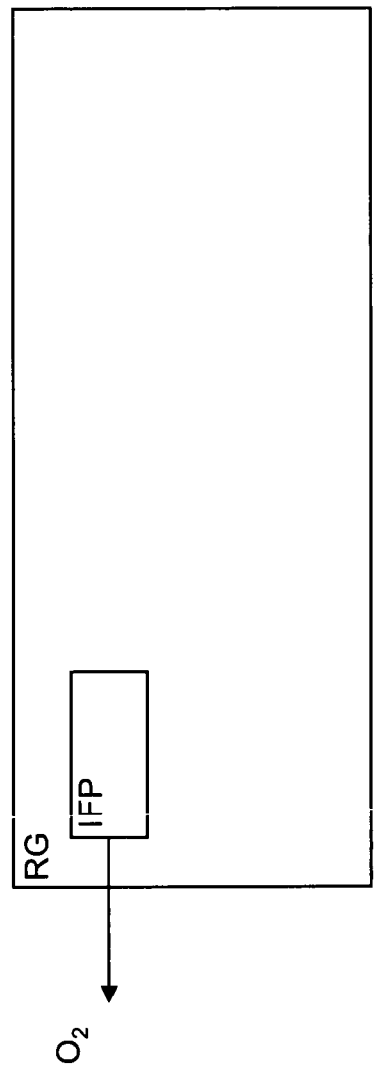
FIG.3: RG

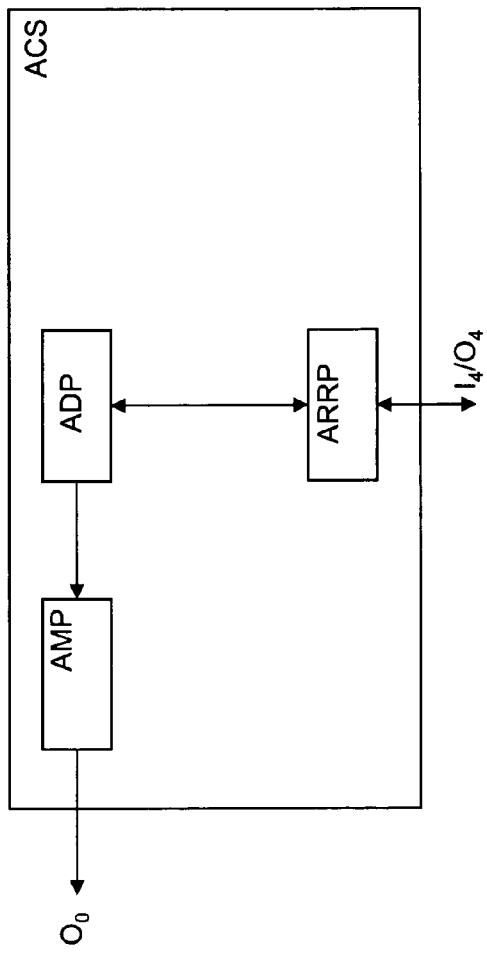
FIG.4: ACS
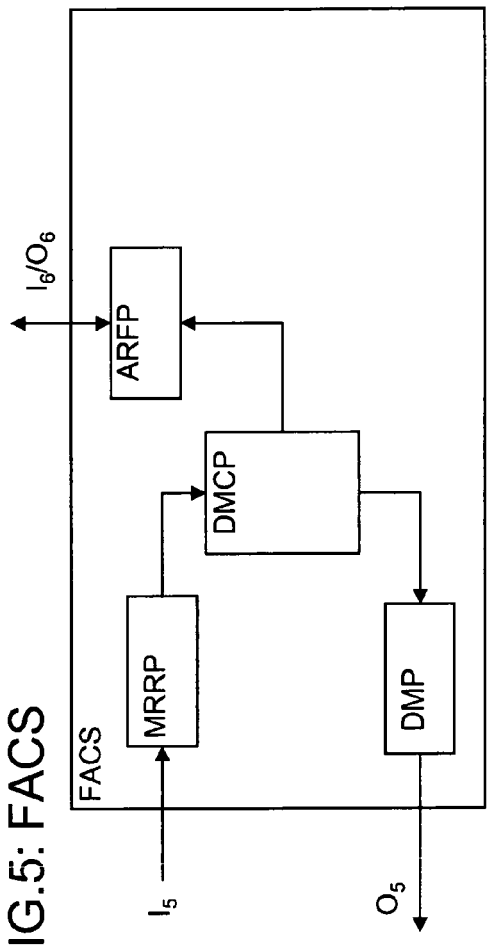
FIG.5: FACS

REMOTE MANAGEMENT METHOD, A RELATED AUTO CONFIGURATION SERVER, A RELATED FURTHER AUTO CONFIGURATION SERVER, A RELATED ROUTING GATEWAY AND A RELATED DEVICE

The present invention relates to a remote management method as described in the preamble of claim 1, the related auto configuration server as described in the preamble of claim 4, the related further auto configuration server as described in the preamble of claim 5, the related routing gateway as described in the preamble of claim 6 and the related device as described in the preamble of claim 7.

Such a remote management method and related devices are already known in the art, e.g. from the DSL Forum document "*Working Text WT-111 Revision 1: Applying TR-069 to Remote Management of Home Networking Devices*" published in August 2004.

Therein, remote configuration by an Auto Configuration Server of CPE equipment coupled to a home network and a connected routing gateway for providing Internet access to the CPE-equipment is described.

Currently a single Auto Configuration Server is used for the remote management and configuration of the routing gateway of the home network and the connected devices inside the home network. The Auto Configuration Server thus is dedicated to the routing gateway and all devices of the coupled home network.

In order to be able to auto configure several special devices besides each other, for instance devices such as a set-top-boxes, a Voice over IP terminals together with for example a gaming devices within the same home network may require a separate Auto configuration server ACS for each type of device.

In order to be able to dedicate a further, i.e. a second or even a third Auto Configuration Server to the respective different home network devices i.e. a Set-top-box (STB), a Voice over IP-terminal, etc the further Auto Configuration Server needs to be able to access the, to be managed, home-network device such as the Set top box, the VoIP-terminal or the gaming device.

Currently, however only the dedicated first Auto Configuration Server is able to reach and access the routing gateway of a certain to be managed, home-network and its corresponding devices. Consequently, further Auto configuration Servers cannot reach and access any of the devices of the home network due to lacking access rights.

An object of the present invention is to provide a remote management method of the above known type but wherein a further Auto configuration Server is able to access and configure a corresponding device of the home network whereto the further Auto configuration Server is dedicated.

According to the invention, this object is achieved by the method described in claim 1, the Auto-Configuration Server (ACS) as described in claim 4 and the further Auto-Configuration Server (ACS) as described in claim 5.

Indeed, by a further Auto-Configuration Server FACS requesting the Auto-Configuration Server ACS to manage, including accessing and configuring, the Routing Gateway RG for providing the further Auto-Configuration Server FACS access to the Routing Gateway and by subsequently the Auto-Configuration Server ACS configuring the Routing Gateway RG to provide the further Auto-Configuration Server ACS access to the Routing Gateway RG, the further Auto-Configuration Server FACS is enabled access to the Routing Gateway RG and subsequently to enabled to manage a dedicated device of the plurality of devices through the routing Gateway RG.

Managing here is meant to include configuring of the Routing Gateway and the devices, installing new software, troubleshooting of the Routing Gateway and the devices, collecting Home Network statistical information etc.

An additional feature of the present system is defined in claim 2.

The further Auto-Configuration Server FACS is able to actually access the Routing Gateway RG and perform the actual management of a device of the plurality of devices through the routing Gateway RG.

A further additional feature of the present system is defined in claim 3, claim 6, claim 7 and claim 8.

The addressing of the Auto-Configuration Server ACS by the further Auto-Configuration Server FACS for requesting the Auto-Configuration Server ACS to access and configure said Routing Gateway RG is based on an identification of said routing gateway and an identity of said Auto-Configuration Server ACS presently available at the further Auto-Configuration Server ACS.

Further characterizing embodiments of the present remote management method and related devices are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 2 represents the functional representation of the device D4 of the home Network as presented in FIG. 1;

FIG. 3 represents the functional representation of the Routing gateway RG as presented in FIG. 1;

FIG. 4 represents the functional representation of the Auto Configuration Server ACS as presented in FIG. 1;

FIG. 5 represents the functional representation of the further Auto Configuration Server FACS as presented in FIG. 1;

Figure 1:
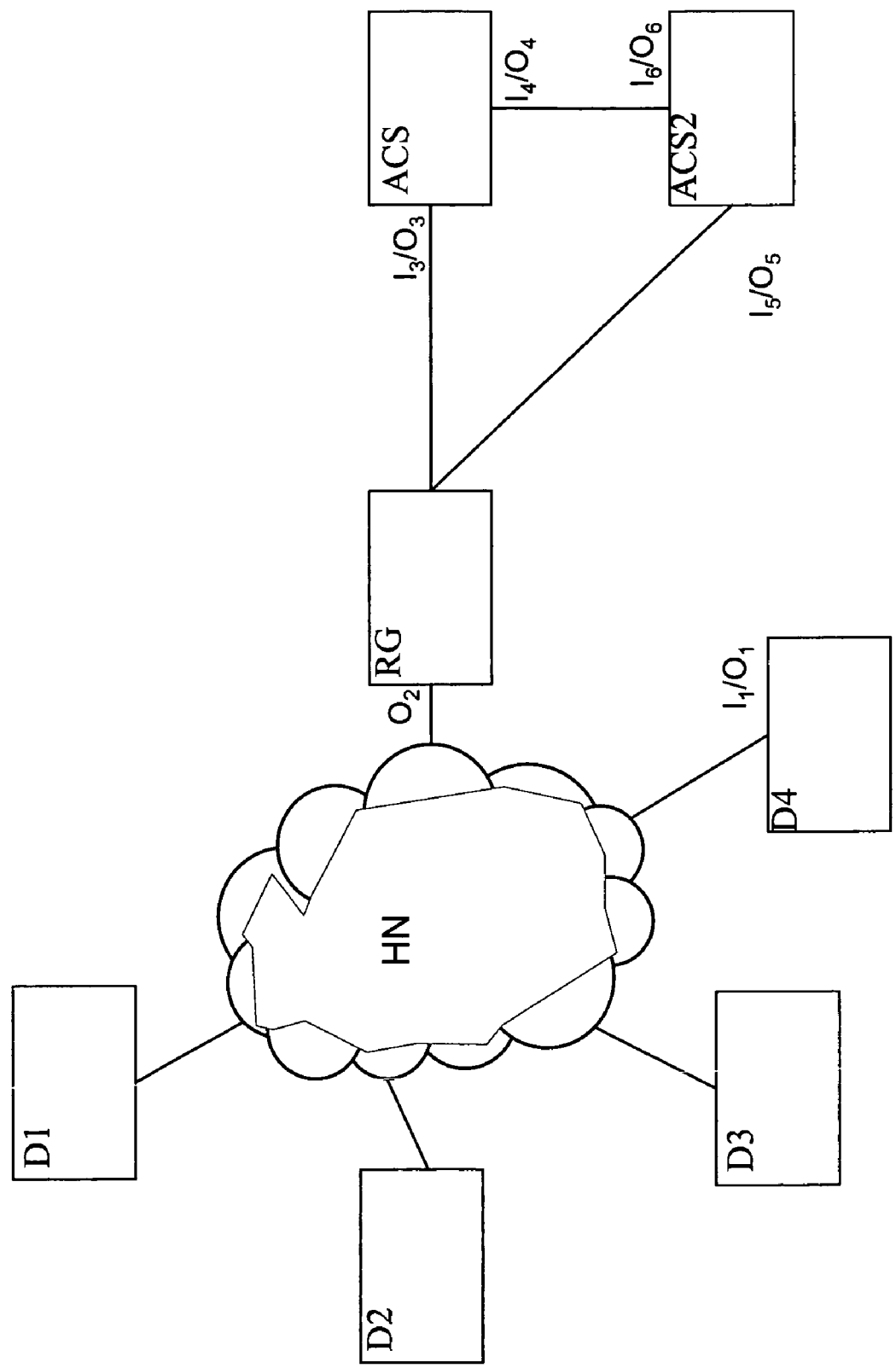
FIG. 1 represents a Home Network HN of the present invention together with a dedicated and further Auto Configuration Server.

In the following paragraphs, referring to the drawings, an implementation of the remote management method, the devices of the Home Network HN together with a Routing Gateway, an Auto Configuration Server ACS and a further Auto Configuration Server FACS according to the present invention will be described. In the first paragraph of this description the main elements of the communications system as presented in FIG. 1 are described. In the second paragraph, all connections between the before mentioned elements and described means are defined. Subsequently all relevant functional means of the device D, the Routing Gateway RG the Auto Configuration Server ACS and the further Auto Configuration Server FACS as presented in corresponding FIG. 2 to 5 are described followed by a description of all interconnections. In the succeeding paragraph the actual execution of the method for waking up a sleeping device is described.

The essential elements of the communications network of the embodiment according to the present invention are devices D1, D2, D3, D4 of the Home Network HN, which may be devices such as the Set top box, VoIP-terminals or gaming devices. The devices may need to be managed, i.e. for instance configured, reconfigured or new software being installed. Further essential network elements are the Routing Gateway RG for providing the devices of the home network HN internet access, the Auto Configuration Server ACS for managing the Routing Gateway RG and possibly also the devices D1, D2, D3, D4 of the home network HN and a further Auto Configuration Server FACS which may be dedicated to special devices within the home network such as a VoIP-devices or a further the Auto Configuration Server for gaming devices or even another type of devices within the home network.

The devices D1, D2, D3, D4 are coupled to the routing gateway RG over the home network HN that may for instance be an Ethernet LAN network. The Routing Gateway RG further being coupled to the Auto Configuration Server ACS via the Internet or via a private network. The further Auto Configuration Server FACS is coupled to said Routing Gateway RG over the Internet or via a private network, and additionally coupled to the Auto Configuration Server ACS over the Internet or via a private network.

The Auto Configuration Server ACS comprises an access request receiving part ARRP that is able to receive a request, for enabling a further Auto Configuration Server FACS access to the Routing Gateway RG, from the further Auto Configuration Server FACS, an access determination part ADP that is adapted to determine a change of access right based on the access request of the further Auto Configuration Server FACS and an access modification part DMCP that is adapted to modify access rights for enabling the further Auto Configuration Server FACS access to the Routing Gateway RG.

The access request receiving part ARRP of the Auto Configuration Server ACS has an input-terminal that is at the same time an input/output-terminal I4/O4 of the Auto Configuration Server ACS. The access determination part ADP is coupled with an input to an output of the access requesting receiving part ARRP. The access modification part AMP is coupled with an input to an output of the access determination part ADP. The access modification part AMP further has an output-terminal that is at the same time an output-terminal O0 of the Auto Configuration Server ACS.

Then, the further Auto Configuration Server FACS comprises a management request reception part MRRP that is adapted to receive a request for being managed, sent by a device whereto said further Auto Configuration Server FACS is being dedicated, a device access managing control part DMCP that is able to generate a request to the Auto Configuration Server ACS for enabling the further Auto Configuration Server FACS access to the Routing Gateway RG and an access request forwarding part ARFP that is adapted to forward the request for enabling the further Auto Configuration Server FACS access to the Routing Gateway RG towards the Auto Configuration Server ACS. Finally the further Auto Configuration Server FACS comprises a device management Part DMP that is adapted to manage, i.e. access and configure a network element such as a Routing Gateway RG and the devices D1, D2, D3 and D4.

This management request reception part MRRP of the Further Auto Configuration Server FACS has an input-terminal that is at the same time an input-terminal 15 of the further Auto Configuration Server FACS. The management request reception part MRRP further is coupled with an output to an input of the Device management Control part DMCP that in turn is coupled with an output to an input of said access request forwarding part ARFP. This access request forwarding part ARFP of the Further Auto Configuration Server FACS has an output-terminal that is at the same time an input/output-terminal I6/O6 of the Auto Configuration Server FACS.

The Device management Part DMP further is coupled with an input to an output of the Device management Control part DMCP. The Device management Part DMP further has an output-terminal that is at the same time an output-terminal O5 of the Auto Configuration Server FACS.

Further there is a Routing Gateway RG that comprises an identity forwarding part IFP that is able to forward, at request of a device of the plurality of devices D1, D2, D3 and D4, an identity of the Routing Gateway RG and an identity of the Auto Configuration Server ACS towards this device. Both identities are preconfigured in the Routing Gateway (not shown).

This identity forwarding part IFP of the Routing Gateway RG) has an output-terminal that is at the same time an output-terminal O2 of the Routing Gateway.

The Device D4, comprises an identity reception part IRP that is able to receive an identity of the Routing Gateway RG and an identity of said Auto Configuration Server ACS forwarded by the Routing Gateway RG, a identity storing part IDSP that is adapted to keep the received identities of the Routing Gateway RG and the Auto Configuration Server ACS for later use and an identity forwarding part IDFP, that is adapted to forward an identity of the Routing Gateway RG and an identity of said Auto Configuration Server ACS towards the further Auto-Configuration Server FACS. The Routing Gateway identity being the Routing Gateway ID and the Auto Configuration Server identity being a Uniform Source Locator, further referred to as URL, of the Routing gateway.

The identity reception part IRP of the device D4 has an input-terminal that is at the same time an input-terminal I1 of the device D4. The identity reception part IRP is further coupled with an output to an input of a identity Storing Part IDSP which in turn is coupled with an output to an input of the identity forwarding part IDFP. The identity forwarding part IDFP has an output-terminal that is at the same time an output-terminal O1 of the device D4

Devices D1, D2 and D3 have the same functional structure as device D4.

In order to explain the working of the present invention it is supposed that device D4 is a special device, for instance a VoIP-terminal, in the home network HN and needs to be configured. As the Auto-Configuration Server ACS which is dedicated to the home network HN is not specialised for managing VoIP-terminals a special Auto-Configuration Server adapted for managing VoIP-terminals needs to be involved in the management of the VoIP-terminal. Further, it is assumed that further Auto-Configuration Server FACS is an Auto-Configuration Server that is specialised in management of VoIP-terminals. This further Auto-Configuration Server FACS therefore dedicated to VoIP-terminal D4 and device D4 is preconfigured with the address, i.e. the URL of this dedicated Auto-Configuration Server FACS It is assumed that device D4 needs some management like for instance configuration or installation of a new software version.

Therefore the identity forwarding part IFP of the routing gateway, forwards, at request of the VoIP-terminal device D4, an identity of the Routing Gateway RG and an identity of said Auto Configuration Server ACS towards device D4. The identity reception part IRP then receives an identity of the Routing Gateway RG and an identity of the Auto Configuration Server ACS dedicated to the Routing Gateway RG of the home Network. These Identities are stored in the Identity storing part of device D4.

Subsequently the identity forwarding part IDFP of Device D4 sends a management request to the further Auto-Configuration Server FACS using the URL of thereof. In the management request message, being for example a DSL forum TR-69 INFORM RPC message, the identity of the Routing Gateway of the home network, being a Routing Gateway id, and the identity of the dedicated Auto-Configuration Server ACS of the home network are, being a URL of this dedicated Auto-Configuration Server, are included. These identities may alternatively be forwarded separately: during for example an auto-configuration phase. The FACS may then store the relationship between the device, the RG identity and the ACS identity. Subsequent requests may then be sent without these identities.

The management request reception part MRRP of the further Auto Configuration Server FACS next receives the request for being managed, sent by VoIP-terminal, device D4, whereto said further Auto Configuration Server FACS is being dedicated because of special VoIP-terminal management capabilities. The device access managing control part DMCP, based on the received request, generates a request to the Auto Configuration Server ACS for enabling the further Auto Configuration Server ACS access to the Routing Gateway RG. The access request forwarding part ARFP forwards the generated request for enabling the further Auto Configuration Server FACS access to the Routing Gateway RG towards the Auto Configuration Server ACS where the request in turn is received by the access request receiving part ARRP of the Auto Configuration Server ACS. Subsequently, the access determination part ADP of Auto Configuration Server ACS determines a change of access right based on the access request forwarded. The access right modification part DMCP subsequently modifies the access rights for enabling the access to the Routing Gateway RG The further Auto Configuration Server FACS then is enabled access to the Routing Gateway RG and subsequently by means of the Device management Part DMP to manage a dedicated device of the plurality of devices through the routing Gateway RG.

It is to be noted that DHCP options can be used to forward the RG-identity towards the devices whereto the Routing gateway is dedicated. Alternatively, besides the DHCP option can be used to also communicate the Auto Configuration Server identity, for instance the URL of the dedicated Auto Configuration Server ACS, to the device. But other protocols UPnP could be used as well.

It is further to be noted that besides that the Auto Configuration Server is able to provide the Further Auto Configuration Server FACS access to the Routing Gateway RG it is also possible that the Auto Configuration Server ASC changes access rights of the routing Gateway RG in such way that the further Auto Configuration Server FACS can configure the Routing Gateway RG itself.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. Remote management method for use in a home network, wherein the home network is a LAN network having a plurality of devices and a Routing Gateway, said Routing Gateway being coupled to each device of said plurality of devices, an Auto-Configuration Server being coupled to said Routing Gateway via one of an Internet or a private network connection and managing a dedicated device of said plurality of devices and said Routing Gateway, said method comprising:

in response to receiving a request by one of the plurality of devices to be managed, forwarding, by the Routing Gateway, to the one of the plurality of devices an identity of the Auto-Configuration Server and said Routing Gateway, wherein the one of the plurality of devices is a special device the Auto-Configuration Server is not configured to manage;

sending, by the special device, a request for being managed and said identity of the Auto-Configuration Server and said Routing Gateway to a further Auto-Configuration Server, the Auto-Configuration Server and the further Auto-Configuration Server being dedicated servers;

requesting, by the further Auto-Configuration Server, said Auto-Configuration Server to access and configure said Routing Gateway for providing said further Auto-Configuration Server access to said Routing Gateway; and configuring, by said Auto-Configuration Server, said Routing Gateway to provide said further Auto-Configuration Server access to said Routing Gateway, wherein the configuring allows the further Auto-Configuration Server to remotely manage the special device.

2. Remote management method according to claim 1, said method further comprising:

accessing, by said Auto-Configuration Server, said Routing Gateway and managing the special device through said routing Gateway.

3. Remote management method according to claim 1 or claim 2, wherein said requesting step is based on an identification of said routing gateway and an identity of said Auto-Configuration Server, wherein said configuring step configures said Routing Gateway to change the access rights of the Routing Gateway, based on the received request from the further Auto-Configuration Server.

4. Auto Configuration Server for use in a home network, wherein the home network is a LAN network having a plurality of devices and a routing gateway, said Routing Gateway being coupled to each device of said plurality of devices, said Auto Configuration Server being coupled to said Routing Gateway via one of an Internet or a private network connection, said Auto Configuration Server comprising:

a processor, configured to receive a request for provisioning a further Auto Configuration Server access to said Routing Gateway from said further Auto Configuration Server, said further Auto Configuration Server sending the request in response to a previous request from one of the plurality of devices to be managed by said further Auto Configuration Server, the Auto-Configuration Server and the further Auto-Configuration Server being dedicated servers, wherein the one of the plurality of devices is a special device the Auto-Configuration Server is not configured to manage;

the processor being configured to determine a change of access based on said access request; and the processor being configured to modify access rights for provisioning said further Auto Configuration Server access to said Routing Gateway, wherein the provisioning allows the further Auto-Configuration Server to remotely manage the special device.

5. A further Auto Configuration Server for use with a home network, wherein the home network is a LAN network having a plurality of devices, a routing gateway, and a (dedicated) Auto Configuration Server, said Routing Gateway being coupled to each device of said plurality of devices via one of an Internet or a private network connection and said Routing Gateway further being coupled to said Auto-Configuration Server, said further Auto Configuration Server comprises:

a processor, configured to receive a request for being managed sent by one of the plurality of devices whereto said further Auto Configuration Server is a dedicated server, wherein the one of the plurality of devices is a special device the Auto-Configuration Server is not configured to manage;

the processor being configured to generate a request to said Auto Configuration Server for provisioning said further Auto Configuration Server access to said Routing Gateway;

the processor being configured to forward said request for provisioning said further Auto Configuration Server access to said Routing Gateway towards said Auto Configuration Server, wherein the provisioning allows the further Auto-Configuration Server to remotely manage the special device.

6. Routing Gateway (RG) for use in a home network, wherein the home network is a LAN network having a plurality of devices, said Routing Gateway being coupled to each device of said plurality of devices via one of an Internet or a private network connection and having a dedicated Auto Configuration Server, said Routing Gateway further being coupled to said Auto-Configuration Server, wherein one of the plurality of devices is a special device the Auto-Configuration Server is not configured to manage, said Routing Gateway comprising:

a processor configured to forward, at a request of the special device, an identity of said Routing Gateway (RG) and an identity of said Auto Configuration Server towards the special device, such that the special device may send a request for being managed to a further Auto Configuration Server, the further Auto-Configuration Server being a dedicated server that remotely manages the special device in response to the request.

7. A special device for use in a home network, wherein the home network is a LAN network having a plurality of devices including the special device, a Routing Gateway being coupled to said each device of said plurality of devices, and coupled to a dedicated Auto Configuration Server via one of an Internet or a private network connection, said Routing Gateway further being coupled to said Auto-Configuration Server, said special device comprising:

a processor configured to forward a request for being managed, an identity of said Routing Gateway, and an identity of said Auto Configuration Server towards a further Auto-Configuration, the further Auto-Configuration Server being a dedicated server that remotely manages the special device in response to the request, wherein the special device is a device the Auto-Configuration Server is not configured to manage.

8. The special device according to claim 7, said special device further comprising:

a processor, configured to receive an identity of said Routing Gateway and an identify of said Auto Configuration Server from said Routing Gateway.

9. A remote management method for use in a home network, wherein the home network is a LAN network, said method comprising:

receiving a request, at a first configuration server, from a second configuration server to access and configure a routing gateway, the second configuration server sending the request in response to a previous request from a special device to be managed by the second configuration server, the first and second configuration servers being dedicated servers, the special device being a device that the first configuration server is not configured to manage; and configuring the routing gateway to provide the second configuration server access to the routing gateway, wherein the configuring allows the second configuration server to remotely manage the special device.

* * * * *